United States Patent
Murakami et al.

(10) Patent No.: US 6,990,874 B2
(45) Date of Patent: Jan. 31, 2006

(54) COLLAPSIBLE TELESCOPIC STEERING APPARATUS

(75) Inventors: Tetsuya Murakami, Nara (JP); Hiroaki Shinto, Nara (JP); Shuzo Hirakushi, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/156,138

(22) Filed: May 29, 2002

(65) Prior Publication Data

US 2003/0000330 A1 Jan. 2, 2003

(30) Foreign Application Priority Data

Jun. 27, 2001 (JP) ........................................ 2001-195039

(51) Int. Cl.
*B62D 1/18* (2006.01)

(52) U.S. Cl. ......................................... 74/493; 280/775

(58) Field of Classification Search .................. 74/492, 74/493; 280/775, 777
See application file for complete search history.

(56) References Cited

U.S. PATENT DOCUMENTS

| | | | | |
|---|---|---|---|---|
| 4,900,059 A | * | 2/1990 | Kinoshita et al. | 280/775 |
| 5,664,806 A | | 9/1997 | Vortmeyer et al. | |
| 5,845,936 A | * | 12/1998 | Higashino | 280/775 |
| 5,899,116 A | * | 5/1999 | Armstrong et al. | 74/492 |
| 5,979,265 A | * | 11/1999 | Kim et al. | 74/493 |
| 6,109,652 A | * | 8/2000 | Kim et al. | 280/777 |
| 6,267,528 B1 | | 7/2001 | Higashino | |
| 6,450,531 B1 | * | 9/2002 | Rinker et al. | 280/775 |
| 6,467,807 B2 | * | 10/2002 | Ikeda et al. | 280/775 |

FOREIGN PATENT DOCUMENTS

| | | |
|---|---|---|
| JP | 55-87863 | 12/1979 |
| JP | 01-131678 | 9/1989 |
| JP | 05-60982 | 8/1993 |
| JP | 9-2293 | 1/1997 |
| JP | 09-048353 | 2/1997 |
| JP | 10-009277 | 1/1998 |
| JP | 10-016795 | 1/1998 |
| JP | 2000-87990 | 3/2000 |
| JP | 2000-211534 | 8/2000 |
| JP | 2002-046625 | 2/2002 |

OTHER PUBLICATIONS

"Infinitely Adjustable Positive Locking Linkage Module Applicable to Rake, Telescope, Rake and Telescope, Tilt, Tilt and Telescope Steering Column Assemblies" Research Disclosure, Kenneth Mason Publications, Hampshire, Great Britain, No. 405; 1998 XP000772330; 2 pages.

* cited by examiner

*Primary Examiner*—Timothy McAnulty
(74) *Attorney, Agent, or Firm*—Rabin & Berdo, P.C.

(57) ABSTRACT

A collapsible telescopic steering apparatus comprises a steering column having an inner tube and an outer tube which are engaged with each other. The engagement state of the tubes is switchable between a press-fit state and a loose-fit state. Upon vehicle collision, the tubes in the press-fit state are slid relative to each other for shock absorption. For telescopic adjustment, the tubes in the loose-fit state are slid relative to each other to adjust the fore-and-aft position of a steering wheel.

7 Claims, 5 Drawing Sheets

COLLAPSIBLE TELESCOPIC STEERING APPARATUS

CROSS REFERENCE TO RELATED APPLICATION

This application claims priority benefits under 35 USC 119 on the basis of Japanese Patent Application No. 2001-195039, the disclosure of which is incorporated herein by reference.

BACKGROUND OF THE INVENTION

1. Field of the Invention

The present invention relates to a collapsible telescopic steering apparatus.

2. Description of Related Arts

In collapsible steering apparatuses adapted for shock absorption during a vehicle collision, inner and outer tubes of a steering column are press-fitted to each other so as to absorb a shock upon vehicle collision.

The inner and outer tubes press-fitted to each other are not moved relative to each other under a normal load, but are slid relative to each other by an impact force exerted thereon during a vehicle collision to absorb a shock.

On the other hand, it is demanded to provide a telescopic adjustment function for adjusting the fore-and-aft position of a steering wheel along the axis of a steering shaft in accordance with the desires of a driver.

To meet the demand, the inventor of the present invention has contemplated to incorporate a telescopic adjustment mechanism in the aforesaid collapsible steering apparatus, wherein the telescopic adjustment mechanism is adapted to slide the inner and outer tubes of the steering column relative to each other to extend or contract the steering column for telescopic adjustment. However, such an arrangement is not feasible.

This is because it is necessary to press-fit the inner and outer tubes to each other for shock absorption but it is impossible to slide the press-fitted inner and outer tubes relative to each other by manually applying a normal operation load to the tubes.

Hence, there is no other way but to employ a telescopic adjustment mechanism of a type which is adapted to move the entire steering column for the telescopic adjustment. However, the telescopic adjustment mechanism of this type requires a greater clearance for moving the entire steering column, so that the size of the steering mechanism is increased.

SUMMARY OF THE INVENTION

It is an object of the present invention to provide a collapsible telescopic steering apparatus which features both a shock absorbing function and a telescopic adjustment function without an increase in size.

In accordance with a preferred embodiment of the present invention, there is provided a collapsible telescopic steering apparatus, which comprises: a steering column comprising an outer tube and an inner tube engaged with each other in an engagement state which is switchable between a press-fit state and a loose-fit state; operation means to be operated to switch the engagement state of the outer and inner tubes between the press-fit state and the loose-fit state; and a telescopic adjustment mechanism for axially sliding the outer and inner tubes relative to each other for adjusting the position of a steering wheel with the engagement state of the outer and inner tubes being switched to the loose-fit state by the operation means; wherein the outer and inner tubes are slid relative to each other for shock absorption upon vehicle collision with the engagement state of the outer and inner tubes being switched to the press-fit state by the operation means.

With this arrangement, the outer and inner tubes engaged with each other in the loose-fit state can easily be slid relative to each other for telescopic adjustment. On the other hand, the outer and inner tubes engaged with each other in the press-fit state are slid relative to each other to absorb an impact energy upon vehicle collision. Thus, the collapsible telescopic steering apparatus ensures both a shock absorbing function and a telescopic adjustment function without an increase in size.

DETAILED DESCRIPTION OF THE PREFERRED EMBODIMENT

Figure 1:
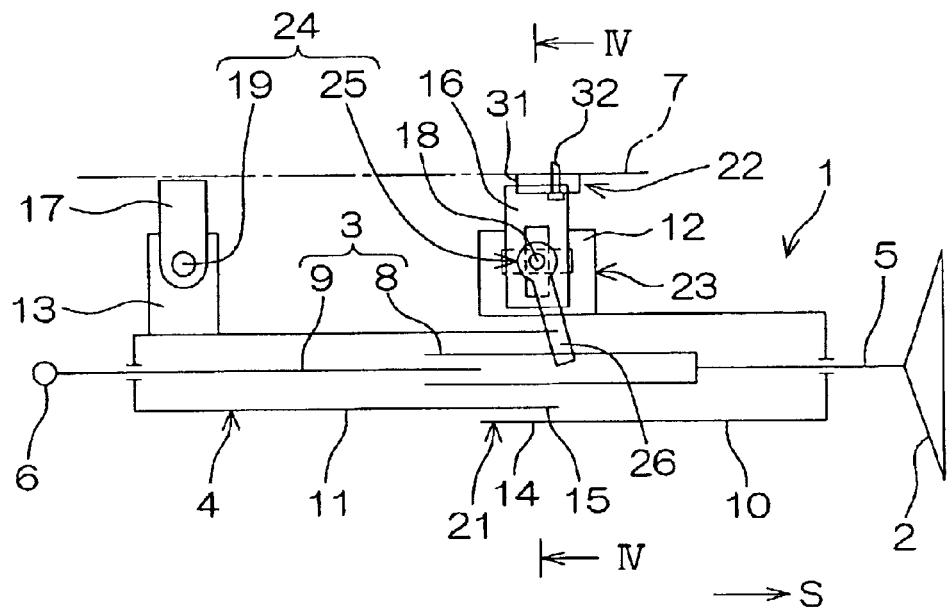
FIG. 1 is a schematic diagram schematically illustrating the construction of a collapsible telescopic steering apparatus with a steering wheel thereof being fixed in position in a normal state in accordance with one embodiment of the present invention.

A collapsible telescopic steering apparatus (also referred to simply as "steering apparatus") according to one embodiment of the present invention will hereinafter be described with reference to the attached drawings. FIG. 1 is a schematic diagram schematically illustrating the construction of the steering apparatus according to the embodiment of the present invention.

Referring to FIG. 1, the steering apparatus 1 includes a steering shaft 3 for transmitting the movement of a steering wheel 2 for steering vehicle wheels (not shown), and a steering column 4 rotatably supporting the steering shaft 3 therein. The steering wheel 2 is coupled to one end 5 of the steering shaft 3. When the steering wheel 2 is rotated, the rotation of the steering wheel 2 is transmitted to a steering mechanism having a pinion and a rack shaft through an intermediate shaft (not shown) which is corotatably coupled to the other end 6 of the steering shaft 3. Thus, the vehicle wheels can be steered.

The steering apparatus 1 is fixed to a vehicle body 7 (partly indicated by a one-dot-and-dash line) so that the axis of the steering shaft 3 extending in a direction S (hereinafter referred to simply as "axial direction S" and indicated by an arrow S) is tilted at an angle with respect to a fore-and-aft axis of the vehicle body, for example, with the steering wheel 2 being located on an upper side. It is noted that the axial direction S is illustrated horizontally in FIG. 1 for the purpose of simplification.

The steering shaft 3 includes an upper shaft 8 constituting its upper portion, and a lower shaft 9 constituting its lower portion. The upper shaft 8 and the lower shaft 9 are coupled with each other by a joint structure such as a spline structure and supported in the steering column 4 by a plurality of bearings (not shown) so as to be axially movable relative to each other and unitarily rotatable.

The steering column 4 has a cylindrical outer tube 10 which rotatably supports the upper shaft 8 in an axial position therein, a cylindrical inner tube 11 which rotatably supports the lower shaft 9 in an axial position therein, an upper bracket 12 fixed to an outer circumferential surface of a forward end portion of the outer tube 10, and a lower bracket 13 fixed to a lower portion of the inner tube 11. The steering column 4 is constructed such that the inner tube 11 is engaged with the outer tube 10. The outer and inner tubes 10 and 11 respectively constitute upper and lower portions of the steering column 4.

The engagement state of the outer tube 10 and the inner tube 11 is switchable between a press-fit state and a loose-fit state.

Except when telescopic adjustment is carried out as will be described later, the outer tube 10 and the inner tube 11 are engaged with each other with an engagement portion 15 of the inner tube 11 being press-fitted in an engagement portion 14 of the outer tube 10. The outer tube 10 of the steering column 4 is fixed to the vehicle body 7 via the upper bracket 12, a support shaft 18, an upper stationary bracket 16, connection members 31, fixture bolts 32 and the like. The inner tube 11 is fixed to the vehicle body 7 via the lower bracket 13, a tilt center shaft 19, a lower stationary bracket 17 and the like.

The steering apparatus 1 includes a first shock absorbing mechanism 21 constituted by the engagement portions 14, 15 of the outer and inner tubes 10, 11 of the steering column 4 and a second shock absorbing mechanism 22 of a so-called capsule structure constituted by the connection members 31 and the like for absorbing an impact energy when a driver bumps against the steering wheel 2 at vehicle collision.

Figure 4:
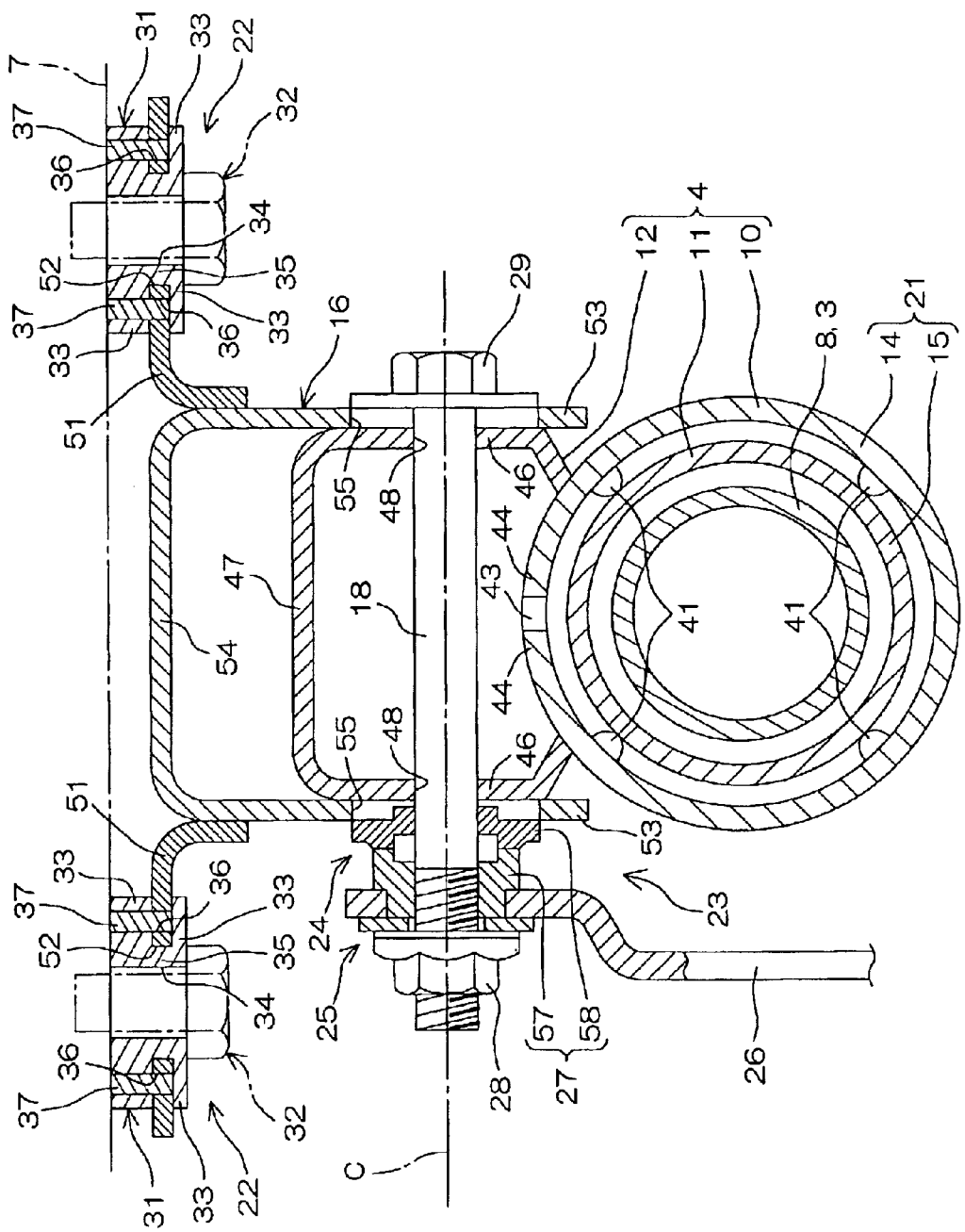
FIG. 4 is a sectional view of the collapsible telescopic apparatus taken along a line VI—VI in FIG. 1.
Figure 5:
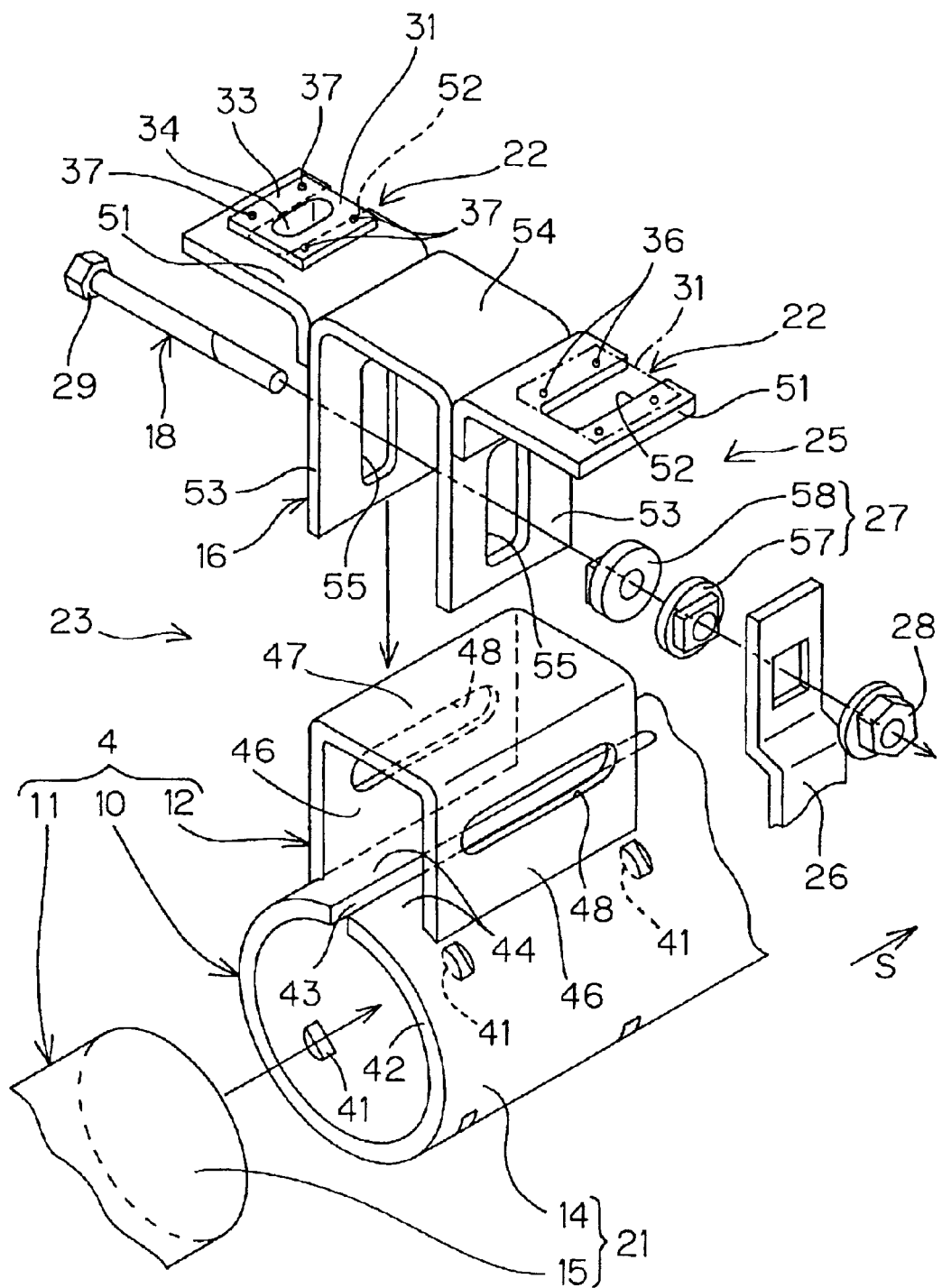
FIG. 5 is an exploded perspective view of the collapsible telescopic steering apparatus shown in FIG. 4.

The first shock absorbing mechanism 21 is capable of absorbing a shock when the engagement portions 14, 15 of the tubes 10, 11 are engaged with each other in the press-fit state. As shown in FIGS. 4 and 5, the engagement portion 14 of the outer tube 10 has projections 41 provided on an inner circumferential surface thereof. Recesses are formed in an outer circumferential surface of the outer tube 10 as positionally corresponding to the projections 41 provided on the opposite surface. With the tubes 10, 11 being in the press-fit state, the projections 41 are pressed against a cylindrical surface, i.e., the outer circumferential surface of the engagement portion 15 of the inner tube 11. Upon reception of an impact force at vehicle collision, the projections 41 are slid relative to the outer circumferential surface of the inner tube 11.

The second shock absorbing mechanism 22 is constituted by fixture seats 51 of the upper stationary bracket 16 each having a cut-away portion 52, the connection members 31 which fix the fixture seats 51 to the vehicle body 7 with the fixture seats 51 being held between the connection members 31 and the vehicle body 7, and the bolts 32 which are inserted in the cut-away portions 52 of the fixture seats 51 and insertion holes 34 of the connection members 31.

The connection members 31 each include a pair of holder pieces 33 which hold the fixture seat 51 of the upper stationary bracket 16, and a connector 35 which connects the holder pieces 33 to each other. The connector 35 is disposed within the cut-away portion 52 of the fixture seat 51. The cut-away portion 52 opens toward the rear side of the vehicle body. The connection member 31 and the fixture seat 51 are engaged with each other along the peripheral edge of the cut-away portion 52. More specifically, one of the holder pieces 33 and the fixture seat 51 each have a plurality of through-holes 36 (e.g., four through-holes) formed in corresponding positions thereof with the connector 35 disposed within the cut-away portion 52. The through-holes 36 extend through the one of the holder pieces 33 and the fixture seat 51, and the through-holes 36 are filled with resin pins 37. The resin pins 37 connect the one holder piece 33 to the fixture seat 51. In this state, the connection member 31 and the fixture seat 51 are integrated as a unit. This unit is fixed to the vehicle body 7 by the bolt 32 inserted in the insertion hole 34 of the connection member 31. The second shock absorbing mechanism 22 prohibits relative movement of the upper stationary bracket 16 with respect to the vehicle body 7 in a normal state and, upon reception of an impact force at vehicle collision, permits the relative movement of the upper stationary bracket 16 with respect to the vehicle body 7.

Figure 2:
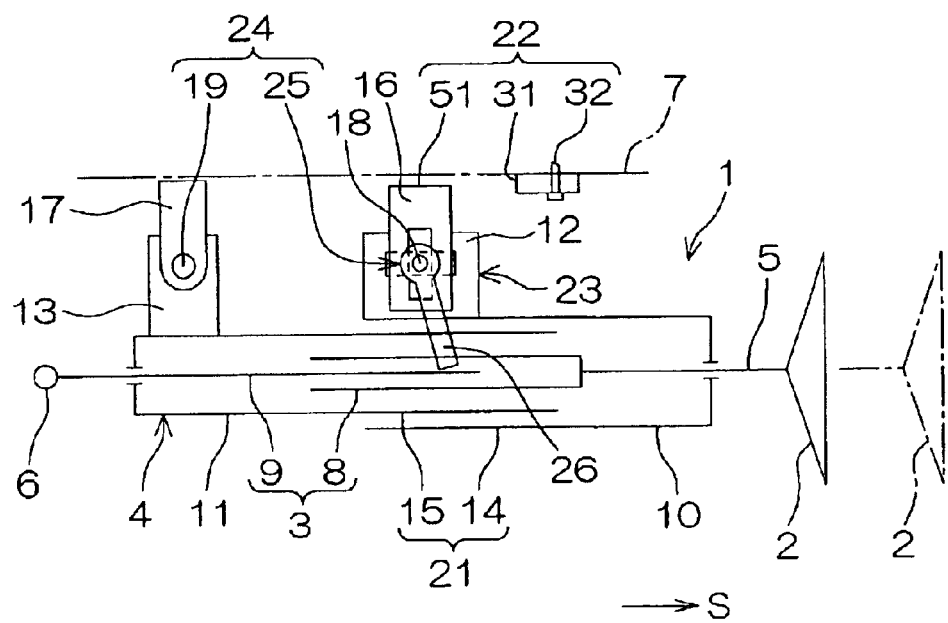
FIG. 2 is a schematic diagram schematically illustrating a state of the collapsible telescopic steering apparatus of FIG. 1 at vehicle collision.

In the second shock absorbing mechanism 22, the resin pins 37 are sheared as shown in FIG. 2 by the impact force at the vehicle collision, whereby an impact energy is absorbed and the holder pieces 33 are disconnected from the fixture seats 51 to permit the upper stationary bracket 16 to move forward relative to the vehicle body.

On the other hand, the engagement portions 14, 15 of the tubes 10, 11 of the first shock absorbing mechanism 21 are axially slid relative to each other upon the vehicle collision while being kept in the press-fit state. Thus, the tubes 10, 11 are deformed, and friction occurs between the tubes 10 and 11, whereby the impact energy is absorbed.

Figure 3:
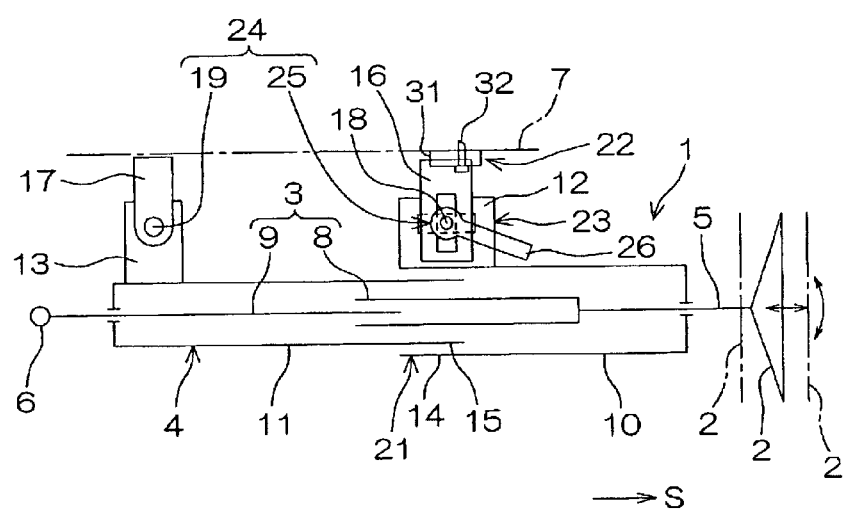
FIG. 3 is a schematic diagram illustrating the collapsible telescopic steering apparatus of FIG. 1 with the steering wheel thereof being adjustable in the normal state.

Further, the steering apparatus 1 is adapted to adjust the position of the steering wheel 2, as shown in FIG. 3, in accordance with the bodily shape and desire of the driver. In the steering apparatus 1 according to this embodiment, the tubes 10, 11 are selectively brought into the press-fit state in which the steering wheel 2 is maintained in position and a shock can be absorbed upon vehicle collision, and brought out of the press-fit state into the loose-fit state in which the position of the steering wheel 2 is adjustable.

The steering apparatus 1 further includes a telescopic adjustment mechanism 23 for adjusting the fore-and-aft position of the steering wheel 2 axially of the tubes 10, 11 (telescopic adjustment), and a tilt adjustment mechanism 24 for adjusting the vertical position of the steering wheel 2 by pivoting the steering column 4 about the tilt center shaft 19 (tilt adjustment). Components of the adjustment mechanisms 23, 24 are partly shared.

The tilt adjustment mechanism 24 is constituted by the tilt center shaft 19, and a lock mechanism 25 for releasably locking the steering column 4 adjusted at a tilt position about the tilt center shaft 19. The lock mechanism 25 also releasably locks the steering column 4 adjusted at a telescopic position as will be described later.

The tilt center shaft 19 extends through round holes formed in the lower stationary bracket 17 and round holes formed in the lower bracket 13 to couple the lower bracket 13 with the lower stationary bracket 17 for relative rotation about an axis of the tilt center shaft 19. Thus, the steering column 4 is supported pivotally about the tilt center shaft 19.

As shown in FIGS. 4 and 5, the lock mechanism 25 is constituted by a pair of side plates 46 of the upper bracket 12, a pair of stationary side plates 53 of the upper stationary bracket 16, a support shaft 18 extending through the side plates 46, 53, an operation lever 26 to be rotated about an axis C of the support shaft 18, and a cam mechanism 27 for pressing the side plates 53 of the bracket 16 against the corresponding side plates 46 of the bracket 12 as the operation lever 26 is rotated.

The upper stationary bracket 16 has a generally inverted U-shape in section, and is constituted by the pair of stationary side plates 53 opposed to each other, a connection plate 54 connecting upper edges of the stationary plates 53 with each other, and the pair of fixture seats 51 extending laterally from the top of the stationary plate 53 transversely of the vehicle body. The upper bracket 12 is held between the stationary side plates 53.

The upper bracket 12 has a generally inverted U-shape in section. The upper bracket 12 is constituted by the pair of side plates 46 opposed to each other, and a connection plate 47 connecting upper edges of the side plates 46 with each other. Lower edges of the side plates 46 are fixed to the outer circumference of the outer tube 10 by welding.

The support shaft 18 is inserted in laterally elongate holes 48 formed in the side plates 46 of the upper bracket 12 as extending in the axial direction S and vertically elongate holes 55 formed in the stationary side plates 53 of the upper stationary bracket 16 as extending generally vertically, whereby the side plates 46 of the upper bracket 12 are coupled with the stationary side plates 53 of the upper stationary bracket 16. Thus, the position of the outer tube 10 of the steering column 4 can be adjusted with respect to the upper stationary bracket 16 in the axial direction S as well as in the pivoting direction about the tilt center shaft 19.

The support shaft 18 has substantially the same configuration as a hexagon head bolt, and has a head 29 provided at one end thereof and an external thread portion provided at the other end thereof. A nut 28 is threadingly fitted around the external thread portion. The cam mechanism 27, one of the stationary side plates 53, the pair of side plates 46 of the upper bracket 12 and the other stationary side plate 53 are arranged in this order between the nut 28 and the head 29.

The cam mechanism 27 includes a cam 57 rotatable unitarily with the operation lever 26 with its position restricted axially of the support shaft 18, and a cam follower 58 engaged with the cam 57. The cam 57 is rotatable relative to the stationary side plates 53 of the upper stationary bracket 16 about the axis of the support shaft 18, while the cam follower 58 is prevented from rotating relative to the stationary side plates 53 of the upper stationary bracket 16 about the axis of the support shaft 18. The cam 57 is relatively rotated about the axes of the cam follower 58 and the support shaft 18 thereby to be moved relative to the cam follower 58 along the axis of the support shaft 18.

With the tubes 10, 11 brought out of the press-fit state into the loose-fit state, the steering column 4 can easily be extended or contracted for telescopic adjustment by sliding the tubes 10 and 11 relative to each other by means of the telescopic adjustment mechanism 23.

More specifically, the outer tube 10 has a slit 43 extending from its open end 42 along its axis. The telescopic adjustment mechanism 23 is constituted by the pair of side plates 46 of the upper bracket 12 fixed to the outer tube 10 in opposed relation with the slit 43 interposed therebetween, the cam mechanism 27 which serves as distance adjustment means for adjusting a distance L between the side plates 46 to increase or reduce the diameter of the outer tube 10, and the operation lever 26 which serves as an operation member for operating the cam mechanism 27.

The diameter of a portion of the outer tube 10 formed with the slit 43 can easily be increased or reduced. The diameter of the outer tube 10 is determined so that the engagement portion 14 of the outer tube 10 in a maximum diameter state (e.g., in a free state under no external load) is spaced a predetermined distance from the engagement portion 15 of the inner tube 11. Therefore, the outer tube 10 in the maximum diameter state can smoothly be slid relative to the inner tube 11.

The single slit 43 has a predetermined length, and extends from the open end 42 linearly in the axial direction S. For example, the length of the slit 43 is virtually equivalent to a maximum length of a part of the engagement portion 15 to be inserted into the engagement portion 14 for the telescopic adjustment in a normal state, but may be greater or smaller than the maximum length. The slit 43 has such a width that the outer tube 10 in a minimum diameter state can be press-fitted around the inner tube 11.

The upper bracket 12 having a generally U-shape straddles the slit 43. The side plates 46 are fixed to the outer circumferential surface of the outer tube 10 by welding as extending generally parallel to the slit 43.

The slit 43, the pair of side plates 46 and the projections 41 of the engagement portion 14 of the outer tube 10 are located in substantially the same axial range of the outer tube 10. That is, the side plates 46 are preferably located within an axial range of the outer tube 10 in which the slit 43 is located. The projections 41 are located within an axial range of the outer tube 10 in which the side plates 46 are located. Therefore, the projections 41 can assuredly be displaced radially of the outer tube 10 by adjusting the distance between the side plates 46, so that the engagement state of the tubes 10, 11 can assuredly be switched between the press-fit state and the loose-fit state.

In such a positional relationship, the projections 41 are located in a region of the outer tube 10 excluding a region defined between the side plates 46, i.e., in a region of the outer tube 10 excluding end portions 44 of an arc of the outer tube 10 as seen in section. This is because the end portions 44 of the arc are liable to be displaced radially outward due to their cantilever structure when the diameter of the tube 10 is reduced.

When the operation lever 26 of the lock mechanism 25 is rotated in one direction (in a locking direction) in the steering apparatus 1 according to this embodiment, opposed cam surfaces of the cam 57 and the cam follower 58 are brought into sliding engagement with respect to each other, so that the cam follower 58 and the head 29 are moved toward each other axially of the support shaft 18 to bring the side plates 46, 53 of the brackets 12, 16 into press engagement.

Figure 6A:
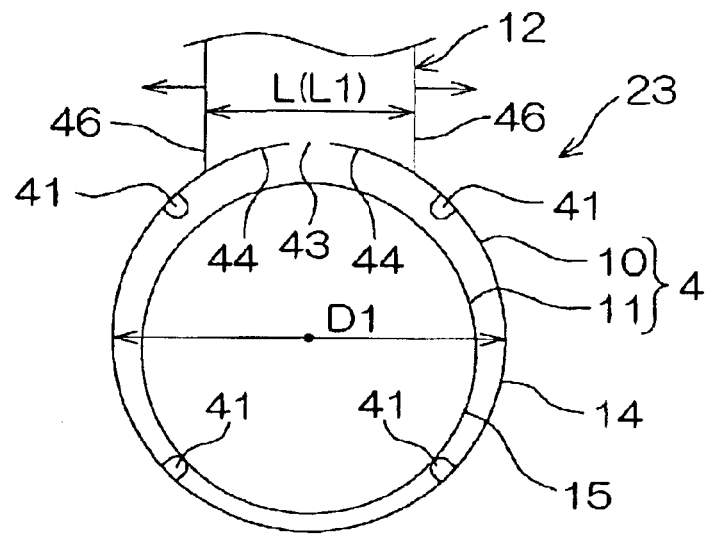
FIG. 6 is a schematic diagram for explaining the operation of a telescopic adjustment mechanism shown in FIG. 1.
Figure 6B:
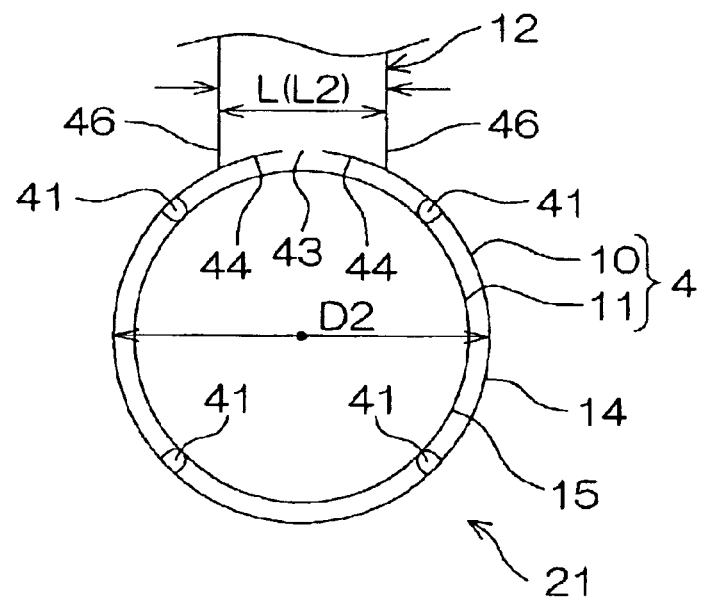

Thus, the distance L between the side plates 46 is reduced to a predetermined distance L2 as shown in FIG. 6B, thereby correspondingly reducing the width of the slit 43 of the outer tube 10. As a result, the engagement portion 14 of the outer tube 10 is contracted to an inner diameter D2 against a resilient restoring force, so that the tubes 10, 11 are brought into the press-fit state.

In the press-fit state, the relative slide of the tubes 10, 11 and the relative movement of the brackets 12, 16 to be manually effected are prevented, and the steering wheel 2 is maintained at an adjusted position as shown in FIGS. 1 and 2. Thus, tilt lock and telescopic lock are achieved. In the press-fit state, the first shock absorbing mechanism 21 can function and, upon vehicle collision, the outer tube 10 and the inner tube 11 are slid relative to each other for absorption of an impact energy.

When the operation lever 26 of the lock mechanism 25 is rotated in the other direction (in an unlocking direction), the cam follower 58 and the head 29 are moved away from each other axially of the support shaft 18 by the action of the cam mechanism 27, so that the side plates 46, 53 of the brackets 12, 16 are brought out of the press engagement. Thus, the distance L between the side plates 46 is increased to a predetermined distance L1 (L1>L2), as shown in FIG. 6A, by the resilient restoring forces of the outer tube 10 and the brackets 12, 16. As a result, the width of the slit 43 of the outer tube 10 is increased, so that the engagement portion 14 of the outer tube 10 is expanded to an inner diameter D1 (D1>D2) as shown in FIG. 6A. Thus, the tubes 10, 11 are brought out of the press-fit state into the loose-fit state.

In the loose-fit state, the relative slide of the tubes 10, 11 and the relative movement of the brackets 12, 16 can easily be achieved even with a relatively small manual operation force for the tilt adjustment and the telescopic adjustment as shown in FIG. 3.

According to this embodiment, an impact energy can be absorbed by allowing the outer and inner tubes 10, 11 of the steering column 4 to slide relative to each other in the press-fit state. When the tubes 10, 11 are brought out of the press-fit state, the tubes 10, 11 can easily be slid relative to each other for the telescopic adjustment.

Since the telescopic adjustment can be achieved by extending or contracting the steering column 4, the size of the steering apparatus 1 can be reduced as compared with a conventional steering apparatus which is adapted to be entirely moved for the telescopic adjustment.

In this embodiment, the telescopic adjustment mechanism 23 can be implemented with a practical construction including the pair of side plates 46 fixed to the outer tube 10 having the slit 43, and the cam mechanism 27 for adjusting the distance between the side plates 46.

Since the first shock absorbing mechanism 21 is of a type which is adapted to slide the tubes 10, 11 relative to each other, the first shock absorbing mechanism 21 has a simplified construction with the engagement portions 14, 15 thereof each having a simple cylindrical shape.

Particularly, the first shock absorbing mechanism 21 is preferably of a type in which the projections 41 are provided on the inner circumferential surface of the outer tube 10. This is because, when the outer tube 10 is contracted in diameter, the projections 41 of the outer tube 10 can assuredly be brought into press contact with the outer circumferential surface of the inner tube 11. Thus, a stable shock absorbing performance can be ensured.

Where the entire steering column 4 is moved relative to the vehicle body for the telescopic adjustment, not only the outer tube 10 but also the inner tube 11 should be supported slidably with respect to the vehicle body. This requires a mechanism for the slidable support. In this embodiment, on the contrary, the tubes 10, 11 are moved relative to each other for the telescopic adjustment. Accordingly, it is merely necessary to provide a mechanism for sliding only the outer tube 10 with respect to the vehicle body without the need for sliding the inner tube 11 with respect to the vehicle body. Therefore, this embodiment can simplify the construction of the steering apparatus.

Since the capsule structure is employed, the brackets 12, 16, the support shaft 18, the lock mechanism 25 and the like are unitarily moved upon vehicle collision. That is, the pair of side plates 46 and the lock mechanism 25 for maintaining the distance between the side plates 46 are unitarily moved, so that the distance between the side plates 46 can assuredly be maintained. As a result, the press engagement of the tubes 10, 11 is stably maintained during shock absorption, so that a shock absorption load can be stabilized. The present invention is applicable to a steering apparatus with no capsule structure. In this case, the elongate holes 48 should be open toward the rear side of the vehicle body.

The present invention is applicable to a steering apparatus in which the outer tube 10 constitutes the lower portion of the steering column 4 and the inner tube 11 constitutes the upper portion of the steering column 4.

As the second shock absorbing mechanism 22, a capsule structure having no resin shear pin may be employed instead of the capsule structure having the resin shear pins 37. Alternatively, any other known shock absorbing mechanisms may be employed in combination.

The distance adjusting means is merely adapted to increase or reduce the diameter of the outer tube 10 by adjusting the distance L between the side plates 46. For example, a known mechanism such as a screw mechanism adapted to adjust the distance between the side plates 46 may be employed as the distance adjusting means instead of the aforesaid cam mechanism 27.

The upper bracket 12 may have such a shape that the upper edges of the side plates 46 are not connected to each other. The shape of the upper stationary bracket 16 may be modified similarly to the upper bracket 12. Although the engagement portion 14 is forcibly contracted in diameter by the cam mechanism 27 as described above, the engagement portion 14 may be allowed to spontaneously contract in diameter by resilient restoring forces of the outer tube 10 and the upper bracket 12. Although the engagement portion 14 is allowed to spontaneously expand in diameter by the resilient restoring forces of the outer tube 10 and the upper bracket 12, the engagement portion 14 may forcibly be expanded in diameter by the cam mechanism 27. The resilient restoring forces may be utilized for either the contraction or the expansion or, alternatively, the diameter of the engagement portion 14 may forcibly be changed for both the contraction and the expansion.

The telescopic adjustment mechanism 23 is merely adapted to bring the tubes 10, 11 out of the press engagement so that the tubes 10, 11 can be slid relative to each other for the telescopic adjustment. Other conceivable arrangements for the telescopic adjustment mechanism 23 are such that the pair of the side plates 46 of the upper bracket 12 are formed integrally with the outer tube 10, and such that the slit 43 extends at an angle with respect to the axial direction.

The first shock absorbing mechanism 21 is merely adapted to slide the tubes 10, 11 of the steering column 4 relative to each other for shock absorption. Although the first shock absorbing mechanism 21 described in the aforesaid embodiment is of the type in which the projections 41 are provided on the inner circumferential surface of the outer tube 10, the first shock absorbing mechanism 21 may be of a type which does not have the projections 41. Other conceivable arrangements for the first shock absorbing mechanism 21 are such that the inner circumferential surface of the outer tube 10 is in cylindrical face-to-face contact with the outer circumferential surface of the inner tube 11, and such that a low-friction cylindrical member is interposed between the inner circumferential surface of the outer tube 10 and the outer circumferential surface of the inner tube 11.

The present invention is applicable not only to the steering apparatus adapted for the telescopic adjustment and the tilt adjustment but also to a steering apparatus having only the telescopic adjustment function without the tilt adjustment function.

Any of various known steering mechanisms, e.g., a ball screw type, may be employed instead of the steering mechanism of the rack and pinion type described above.

While the present invention has thus been described in detail byway of the specific embodiment thereof, those skilled in the art will easily come up with variations, modifications and equivalents of the embodiment in light of the disclosure. Therefore, it should be understood that the scope of the present invention be defined by the appended claims and their equivalents.

What is claimed is:

1. A collapsible telescopic steering apparatus, comprising:
    a steering column comprising an outer tube having an open end, and a slit axially extending from the open end, and an inner tube engaged with said outer tube in an engagement state which is switchable between a press-fit state and a loose-fit state, said outer tube further having a plurality of projections provided on an inner circumferential surface thereof in a circumferentially spaced relation so as to be pressed against an outer circumferential surface of the inner tube;
    operation means to be operated to switch the engagement state of the outer and inner tubes between the press-fit state and the loose-fit state, the operation means switching the engagement state of the outer and inner tubes between the press-fit state and the loose-fit state via a distance adjusting means; and
    a telescopic adjustment mechanism for axially sliding the outer and inner tubes relative to each other for adjusting a position of a steering wheel with the engagement state of the outer and inner tubes being switched to the loose-fit state by the operation means, said telescopic adjustment mechanism including:
        an upper bracket that straddles the slit of the outer tube, and having essentially an inverted U-shape defined by a pair of side plates and a connection plate, each side plate having a first edge portion and a second edge portion, each first edge portion being fixed to an outer circumferential surface of the outer tube and at an end portion of the outer tube, with the side plates being disposed in opposed relation and with the slit being interposed therebetween, so that the slit completely separates the side plates from each other, the connection plate being connected to the second edge portion of each side plate; and
        the distance adjusting means for adjusting a distance between the side plates to increase or reduce a diameter of the outer tube;
    wherein the outer and inner tubes are slid relative to each other for shock absorption upon vehicle collision with the engagement state of the outer and inner tubes being switched to the press-fit state by the operation means.

2. A collapsible telescopic steering apparatus as set forth in claim 1, wherein the distance adjusting means comprises a cam and a cam follower which are engaged with each other in relatively rotatable manner.

3. A collapsible telescopic steering apparatus asset forth in claim 2,
    wherein the operation means comprises a manually rotatable operation lever, and
    wherein the cam is rotatable unitarily with the operation lever, and the cam follower is prevented from rotating relative to the operation lever.

4. A collapsible telescopic steering apparatus as set forth in claim 3, further comprising a stationary bracket fixed to a vehicle body, the stationary bracket comprising a pair of side plates respectively fitted on outer surfaces of the side plates fixed to the outer tube,
    wherein the cam is pressed against the cam follower by the rotation of the operation lever to press the side plates of the stationary bracket against the corresponding side plates fixed to the outer tube, whereby the outer and inner tubes are brought into the press-fit state.

5. A collapsible telescopic steering apparatus as set forth in claim 1, wherein the pair of side plates fixed to the outer tube and the slit are located in substantially the same axial range of the outer tube.

6. A collapsible telescopic steering apparatus as set forth in claim 5,
    wherein the projections are located in an axial range of the outer tube in which the pair of side plates are located.

7. A collapsible telescopic steering apparatus as set forth in claim 6, wherein the projections are located in a circumferential range excluding a region defined between the side plates.

* * * * *